(12) United States Patent
Overbey

(10) Patent No.: US 9,107,353 B1
(45) Date of Patent: Aug. 18, 2015

(54) SNAP ON CLONING MOLD FOR AIR LAYERING OF PLANTS

(71) Applicant: Charles Albert Overbey, Cocoa Beach, FL (US)

(72) Inventor: Charles Albert Overbey, Cocoa Beach, FL (US)

( * ) Notice: Subject to any disclaimer, the term of this patent is extended or adjusted under 35 U.S.C. 154(b) by 24 days.

(21) Appl. No.: 14/120,673

(22) Filed: Jun. 16, 2014

(51) Int. Cl.
*A01G 9/10* (2006.01)
*A01G 13/02* (2006.01)

(52) U.S. Cl.
CPC .................................. *A01G 9/1073* (2013.01)

(58) Field of Classification Search
CPC ..... A01G 7/00; A01G 13/10; A01G 13/0237; A01G 13/00; A01G 17/10; A01G 1/06; A01G 9/1073; A01G 1/00; A01G 13/02; A01G 9/10
USPC ............................. 47/5.5, 6, 7, 23.1, 24.1, 32
IPC .............. A01G 7/00, 13/10, 13/00, 17/10, 1/06, A01G 1/00, 13/02, 9/10
See application file for complete search history.

(56) References Cited

U.S. PATENT DOCUMENTS

| 90,548 A | * | 5/1869 | Hutchinson | 47/6 |
| 1,868,609 A | * | 7/1932 | Lam | 47/73 |
| 2,021,793 A | * | 11/1935 | Lam | 47/73 |
| 8,127,489 B2 | * | 3/2012 | Cagata et al. | 47/5.5 |
| 8,171,669 B1 | * | 5/2012 | Park | 47/32 |
| 2008/0034649 A1 | * | 2/2008 | Sanchez et al. | 47/44 |

FOREIGN PATENT DOCUMENTS

| EP | 21963 | * | 1/1981 | A01G 9/10 |
| FR | 1319409 | * | 3/1963 | A01G 9/00 |
| JP | 2009095241 | * | 5/2009 | A01G 1/00 |

OTHER PUBLICATIONS

Machine translation of EP 21963, to Techniflore, published Jan. 1981.*
Machine translation of JP 2009095241 to Sato, published May 2009.*
Machine translation of FR 1319409 to See, published Mar. 1963.*

* cited by examiner

*Primary Examiner* — Kathleen Alker

(57) ABSTRACT

A time saving snap on cloning mold for use in cloning a plant by air layering. The mold has a reservoir for storing liquid to keep the rooting medium in the air layer moist by wicking of the liquid throughout a long period of root development. The cloning mold quickly snaps on the branch that is being air layered. The reservoir is effective when the mold is used on both branches that are growing with an upward tilt and those growing with a downward tilt.

6 Claims, 3 Drawing Sheets

FIG. 1
FIG. 2
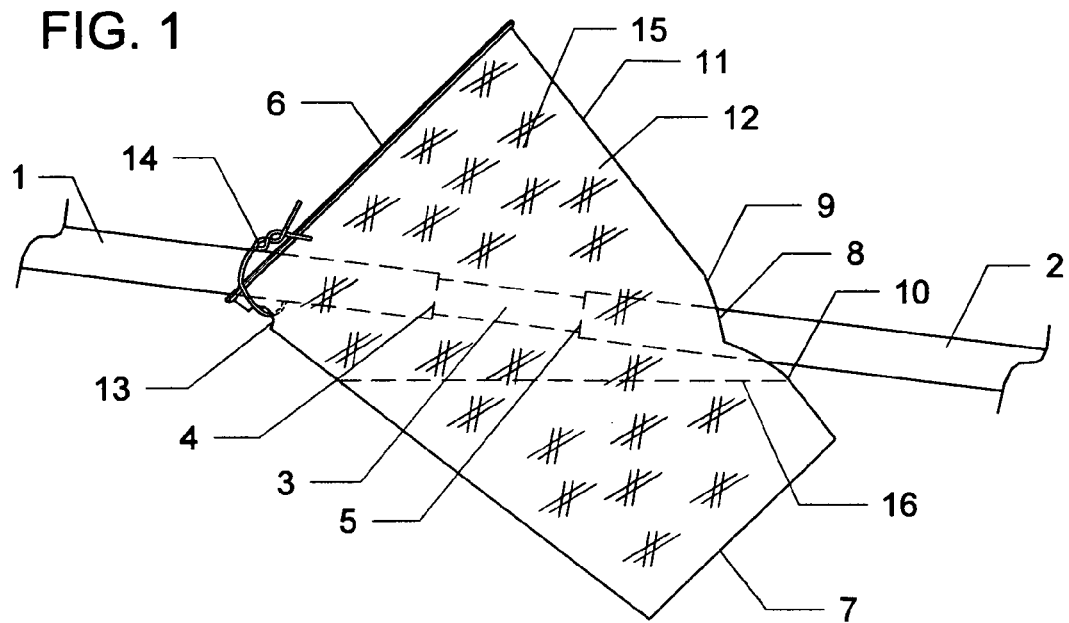
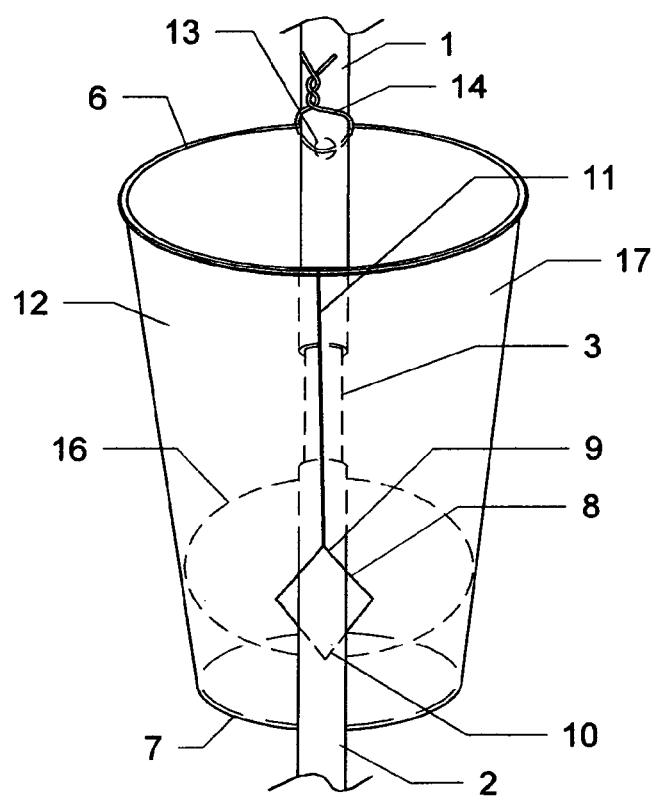

SNAP ON CLONING MOLD FOR AIR LAYERING OF PLANTS

BACKGROUND

The present invention relates to a cloning mold for use as an aid in the process of cloning a plant by air layering.

More particularly, initially, the invention assists the user while he is in the process of physically performing the task of making his usual air layer by helping him to perform the task in an accurate, fast and economical manner. In the period that ensues after the physical installation, the invention enhances the chances of a successful outcome of root generation within the air layer over the time required for the rooting to take place and enables the user to know when the roots have been sufficiently formed.

The common process of air layering plants entails the placing a mass of moist, and often dripping, rooting medium, such as sphagnum moss, over a wound made to the branch in a standard manner and then wrapping the mass of medium with a sheet of plastic and tightly securing each end to the branch to provide a seal. When done by an experienced gardener, and if the moist material doesn't lose too much moisture while being formed around the branch and over the wound, or dry out before rooting occurs, this is an effective method. However, even experienced gardeners have difficulties in the process because of the problem involved in trying to place, to form, and to keep the proper quantity of the drippy mass in its required location around the wound while simultaneously trying to apply his plastic sheeting under, over and around the mass without losing too much moisture from the mass. Stabilizing the mass by use of the cloning mold solves this problem and enables the gardener to easily apply and seal his sheet of plastic. Premature drying out of the medium before roots have properly formed is another common problem. With the present invention, which has built-in liquid storage features, these problems are significantly reduced. The invention is made of molded plastic material, preferably clear.

In operation, after the usual wound in the branch has been made, and before the usual wrapping and sealing by the gardener with plastic sheeting proceeds, the cloning mold, which has a water reservoir, is snapped on the branch in an optimum location relative to the wound that has been made to the branch by the gardener and is fixed in place with a "twist-tie". The cloning mold is then filled with the rooting medium that has been moistened to suit. The gardener may add some water into the cloning mold where it will be retained for wicking up by the medium when a long period of time is needed for root development. The moistened mass is now totally in place and stabilized by the mold so the gardener completes his common sealing with clear plastic sheeting with ease. With snap on cloning molds made of clear or slightly translucent plastic, the progress of root development can be monitored so the gardener knows when the cloned branch is ready to be removed from the parent plant.

Other methods and apparatus for forming and holding a mass of medium about the wound of the branch and keeping it moist are discussed in the following references:

U.S. Pat. No. 2,021,793 A, by inventor Lam, speaks to a multiple piece device having a two piece cylinder held together by staples or other means and having two split discs that must be separately attached so as to act as closures for the ends of the cylinder. The top disc has a hole in it larger than the hole that is in the lower disc. It is required that water be periodically added through the top hole if the branch is primarily vertical. When the branch is horizontal the required water is added through a similar hole in the side.

U.S. Pat. No. 8,127,489 B2 by Artimio N Cagata and Ardel Cagata. Here the invention has two clamshells that cover the branch. Repeated watering is required while roots are in process of developing.

Patent EP 0021963 A1 by See and Lemaire depicts a pot that has multiple parts. Basically, it is two clamshells that are placed around a branch and then joined together. Optionally the two clamshells may be made with a hinge that permits them to swing apart. Other parts are also involved which increases the final cost of manufacture of the total assembly.

U.S. Pat. No. 8,171,669 B1 by Hong Ku Park: Here, again, we have a clamshell device and a configuration that permits early evaporation of the moisture from within the cavity during the time period when roots should be forming. Repeated addition of water to the mass of rooting medium is required through a flared opening at the top of the assembled clamshells.

SUMMARY

In each instance there is the distinct disadvantage of having to repeatedly add water to the pot. From an economics point of view, some units are not configured so as to be nested one within the other for economical shipping of multiple units.

An object of the present invention is to overcome these, and other, disadvantages and provide an extremely low cost cloning mold, so low as to even be considered expendable, for use by homeowners and professional plant nurseries and will not interfere with their standard method of air layering of plants but will make it less frustrating and time consuming.

Another object is to provide a snap on cloning mold that may be may quickly snapped on to a branch and secured in place by "twist-ties."

Another object is to provide a defined liquid storage reservoir for wicking liquid into the rooting medium over time.

Another object is to provide a cloning mold that may be produced very cheaply and nested one within the other for shipment.

Another object, is to make cloning molds available in clear and/or translucent plastic so as to provide a means for the gardener to check the state of root development without violating the integrity of his air layer. The molds may also be made with opaque plastic.

These and other advantages will become more apparent from the following specification and the accompanying illustrative but not restrictive drawings.

DRAWINGS

FIG. 1 is a side elevation view showing the cloning mold in place over the wound of a branch having a positive slope with respect to the horizon, the mold having been filled with rooting medium.

FIG. 2 is a front oblique elevation view of an empty cloning mold in place on a vertical wounded branch.

DESCRIPTION OF THE INVENTION

Figure 3:
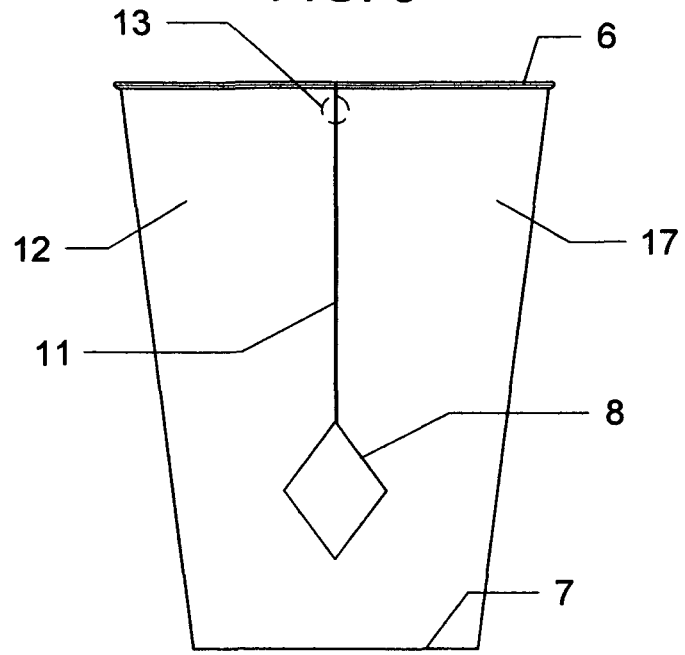
FIG. 3 is a front elevation view of the cloning mold.

With reference to FIG. 1, reference numeral 1 designates the part of a branch that is toward the tip of the branch.

Reference numeral 2 designates the rest of the branch. Reference numeral 3 designates the wound made to the branch by the gardener. Reference numeral 4 designates the upper end of the wound. Reference numeral 5 designates the lower end of the wound. Reference numeral 6 designates the rim of the cloning mold. Reference numeral 7 designates the base of the cloning mold. Reference numeral 13 designates the small hole located near the top of the cloning mold to accommodate an attaching means. Reference numeral 14 designates the attaching means. Reference numeral 9 designates the top edge of a hole in the structure of the cloning mold. Reference numeral 8 designates the side of the hole. Reference numeral 10 designates the lower edge of the hole. Reference numeral 11 designates a split in the structure of the cloning mold extending from rim 6 to the top edge 9 of the hole. Reference numeral 12 designates the left sidewall of the cloning mold. Reference numeral 15 designates the rooting medium. Reference numeral 16 designates the liquid capacity of the reservoir within the cloning mold.

With further reference to FIG. 1, the view shows a cloning mold attached to a branch growing at a positive angle to the horizon and already filled with rooting medium 15. The cloning mold is attached on a branch by means of a single "twist tie" 14, for which, other ties, such as string, could be substituted. The lower portion of the mold is supported by the walls of the mold in the general area of reference numerals 8 and 9. The cloning mold is shown here as constructed of clear plastic which enables the gardener to accurately locate the mold in a longitudinal location along the branch with respect to wound 3 and fix it in that precise location with attachment means 14. The mold is shown filled by the gardener with a rooting medium and ready for his next step of covering and sealing it with a sheet of plastic, as has been done for many years.

Again referring to FIG. 1, a liquid reservoir is provided by the shape of the cloning mold and location of the hole defined by 8, 9 and 10 through which the branch protrudes. The liquid holding capacity when the mold is at this angle is shown by 16. The liquid level is here limited by the lower edge 10 of the hole. The liquid holding capacity of the reservoir can be changed in manufacture by locating the hole 8, 9 and 10 more toward the base 7 or toward the rim 6.

With reference to FIG. 2, reference numeral 1 designates the part of a branch that is toward the tip of the branch. Reference numeral 2 designates the rest of the branch. Reference numeral 3 designates the wound of the branch. Reference numeral 6 designates the rim of the cloning mold. Reference numeral 7 designates the base of the cloning mold. Reference numeral 13 designates the small hole located near the top of the cloning mold to accommodate an attaching means. Reference numeral 14 designates an attaching means. Reference numeral 9 designates the top edge of a hole in the structure of the cloning mold. Reference numeral 8 designates the side of the hole. Reference numeral 10 designates the lower edge of the hole. Reference numeral 11 designates a split in the structure of the cloning mold extending completely from the rim reference numeral 6 to the upper edge of the hole reference numeral 9. Reference numeral 12 designates the left sidewall of the cloning mold. Reference numeral 17 designates the right sidewall of the cloning mold. Reference numeral 16 designates the liquid capacity of the reservoir within the cloning mold when the mold is on a branch that is vertical. Here, as in FIG. 1, the liquid holding capacity 16 is limited by the lower edge 10 of the hole.

With reference to FIG. 3, the reference numeral 6 designates the rim of the cloning mold. Reference numeral 7 designates the base. Reference numeral 8 designates the side of the hole in the structure of the cloning mold. Reference numeral 11 designates the split in the structure of the cloning mold. Reference numeral 13 designates the small hole on the backside. Reference numeral 12 designates the left sidewall of the cloning mold as split by reference numeral 11. Reference numeral 12 designates the right sidewall of the cloning mold.

Figure 4:
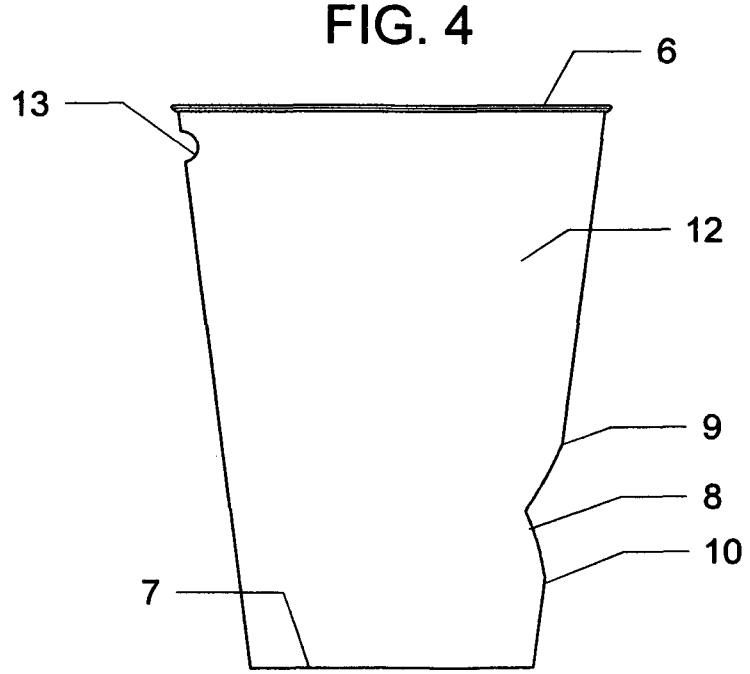
FIG. 4 is a side elevation view of the cloning mold.

With reference to FIG. 4, the reference numeral 6 designates the rim of the cloning mold. Reference numeral 7 designates the base. Reference numeral 8 designates the side of the hole in the structure. Reference numerals 9 and 10 designate the upper and lower edges of the hole. Reference numeral 12 designates the left sidewall of the cloning mold. Reference numeral 3 designates the small hole to accommodate an attaching means.

Figure 5:
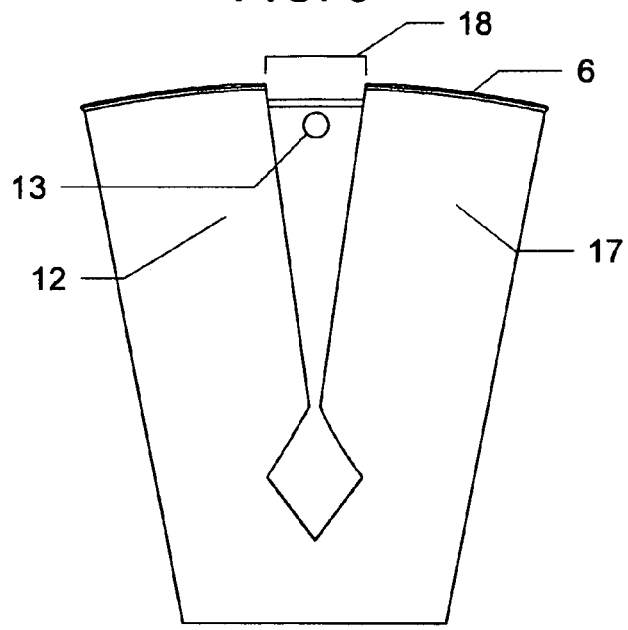
FIG. 5 is a front elevation view of the cloning mold showing the momentary spreading of the rim at the top of the mold as it is started over the branch at the time of installation.

With reference to FIG. 5, reference numeral 6 designates the rim of the cloning mold. Reference numeral 13 designates the small hole in the structure for the attaching means. Reference numeral 12 designates the left sidewall of the cloning mold. Reference numeral 17 designates the right sidewall. Reference numeral 18 designates the gap at the top between the sidewalls 12 and 17 when the structure, which is designed to resume it's shape, is temporarily spread as the cloning mold is started over the wounded branch as it is being applied to the branch. The reference numeral 18 gap immediately closes as the cloning mold snaps on the branch and resumes it's original shape.

Figure 6:
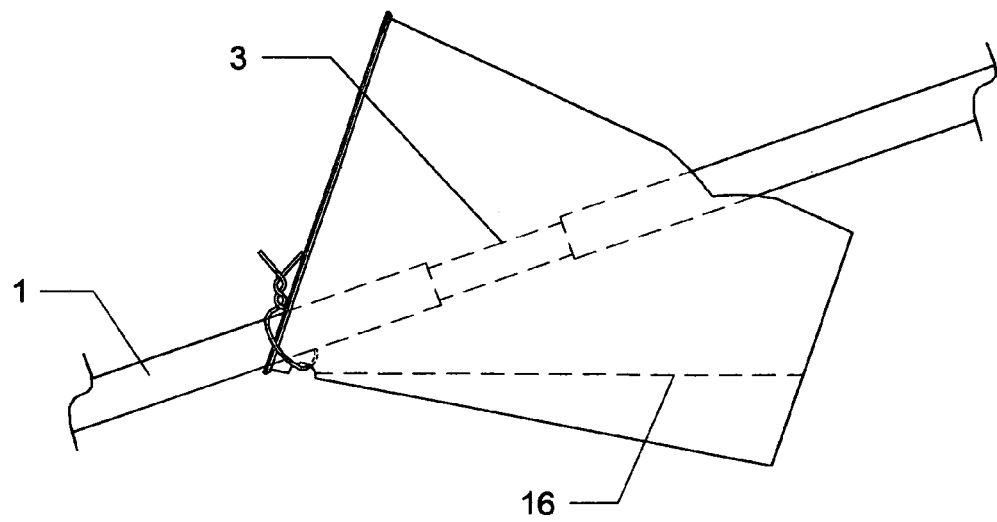
FIG. 6 is a side elevation view of the cloning mold installed on a branch having a negative angle with respect to the horizon.

FIG. 6 illustrates that the cloning mold retains a reservoir even though the branch is growing with a negative tilt with respect to the horizon. The end of the branch toward it's tip is designated by reference numeral 1. Reference numeral 3 designates the wound covered by the cloning mold. The liquid holding capacity within the reservoir of the cloning mold is designated by the reference numeral 16.

Although preferred embodiments of the invention have been described in detail, it is contemplated that modifications of the apparatus and method may be made and some features may be employed without others, all within the scope of the invention.

I claim:

1. A mold for use in cloning plants, said mold adapted to snap on to a branch of a plant for air layering, comprising:
   A. a hollow member having a wall, one closed end and one open end;
   B. said hollow member being made of plastic material having a predetermined degree of strength, flexibility, clarity and spring-back characteristics;
   C. said hollow member adapted to hold rooting medium in place around said branch;
   D. said wall having a hole located near the closed end and having a top edge, side, and lower edge, said mold being configured to allow said branch to pass through said hole and said open end;
   E. said wall having a slit extending from said open end to said hole, the flexibility and spring-back characteristics of said plastic material allowing edges of said wall forming said slit to be temporarily spread and then held closed when said mold snaps on said branch;
   F. said wall having a second hole opposite said slit and near said open end to accommodate means for attaching said hollow member to said branch.

2. The mold for use in cloning plants, said mold adapted to snap on to a branch of a plant for air layering, as defined in claim 1, wherein said hollow member is a one piece structure.

3. The mold for use in cloning plants, said mold adapted to snap on to a branch of a plant for air layering, as defined in claim 1, said hollow member being tapered to facilitate ease in slipping of said hollow member off said branch after roots have formed and said branch has been cut from its parent plant.

4. A mold for use in cloning plants, said mold adapted to snap on to a branch of a plant for air layering, comprising:
- A. a hollow member having a wall, one closed end and one open end;
- B. said hollow member being made of plastic material having a predetermined degree of strength, flexibility, clarity and spring-back characteristics;
- C. said hollow member adapted to hold rooting medium in place around said branch;
- D. said wall having a hole located near the closed end and having a top edge, side, and lower edge, said mold being configured to allow said branch to pass through said hole and said open end;
- E. said wall having a slit extending from said open end to said hole, the flexibility and spring-back characteristics of said plastic material allowing edges of said wall forming said slit to be temporarily spread and then held closed when said mold snaps on said branch;
- F. said wall having a second hole opposite said slit and near said open end to accommodate means for attaching said hollow member to said branch;
- G. Said mold forming a built-in reservoir for storing water, the maximum liquid capacity of said reservoir being controlled by positioning of said holes in said wall or said closed end of said hollow member.

5. The mold for use in cloning plants, said mold adapted to snap on to a branch of a plant for air layering, as defined in claim 4, said hollow member being made of clear or translucent plastic to enable a visual check of liquid level and root development.

6. The mold for use in cloning plants, said mold adapted to snap on to a branch of a plant for air layering, as defined in claim 4 adapted to be mounted on branches having either an upward or a downward tilt with respect to the horizon without spillage of liquid or said rooting medium.

\* \* \* \* \*